No. 737,205. PATENTED AUG. 25, 1903.
E. B. CADWELL.
TIRE.
APPLICATION FILED MAR. 14, 1902.
NO MODEL.
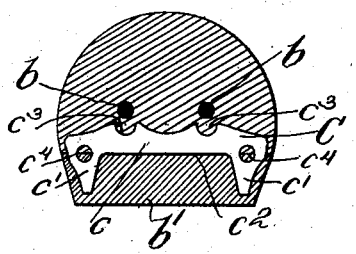
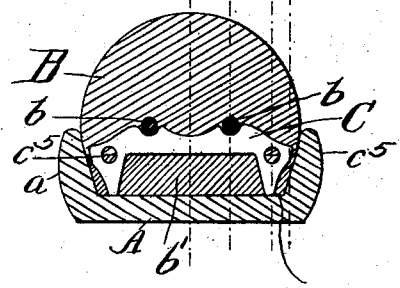
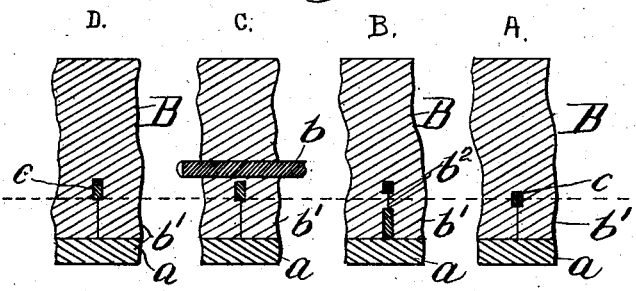
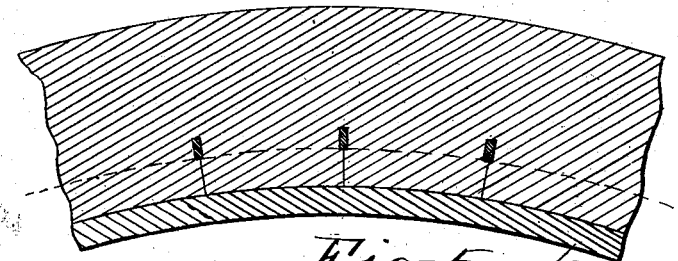
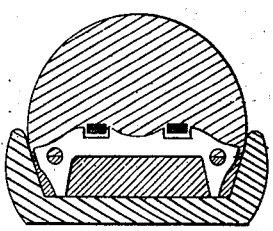
Witnesses
Ralph Jonas
Geo. N. Kerr.
Edwin B. Cadwell Inventor
By his Attorney C. N. Edwards No. 737,205. Patented August 25, 1903.

UNITED STATES PATENT OFFICE.

EDWIN B. CADWELL, OF NEW YORK, N. Y.

TIRE.

SPECIFICATION forming part of Letters Patent No. 737,205, dated August 25, 1903.

Application filed March 14, 1902. Serial No. 98,161. (No model.)

*To all whom it may concern:*

Be it known that I, EDWIN B. CADWELL, a citizen of the United States, residing at New York city, in the county of Kings and State of New York, have invented certain new and useful Improvements in Tires, of which the following is a full, clear, and exact specification.

My invention relates to tires for the wheels of vehicles, and more particularly to that class of tires having a rubber tread which is held by suitable means within the channel or between the flanges of a channel piece or rim.

The objects of my invention are to prevent the means for retaining the tread within the channel-piece from cutting the base portion of said tread and to prevent said means from being drawn over the flanges of the channel-piece or pulled out of the channel thereof, to enable the retaining means or binding wires to be located farther from the base of the tire than has heretofore been possible, and also to limit or regulate the distance of said retaining means from the base of the channel, and, further, to permit the use of a cheap "filling-piece" for the base of the tread portion of the tire, thus decreasing the cost of the tire and also the compression of said tread at the base and obtaining an equalization of compression of the tread at base and periphery.

With these objects in view my invention consists in the elements, features, and combinations of parts hereinafter described, and pointed out in the claims.

In the accompanying drawings, forming part of this specification, Figure 1 is a vertical cross-section of the tread portion of a tire, showing the features of my invention. Fig. 2 is a similar view showing the tread and channel-piece together. Fig. 3 shows in four distinct sections the several details of my invention, the sections being longitudinally of the tire and taken, respectively, at the lines A, B, C, and D in Fig. 2. Fig. 4 is a vertical longitudinal section of the tire; and Fig. 5 is a section of the tire shown in Fig. 2, but employing a modified form of retaining-wire.

It is not considered essential to an understanding of this invention to illustrate any of the details of the wheel to which the tire herein described is to be applied, it being well understood that the channel-piece can be secured in place in any manner without affecting the merits of my invention.

A indicates the channel-piece, which is made of any material suitable. This channel-piece has flanges $a\ a$, which are caused to flare slightly, and between said flanges is a channel in which the base of the tread is set and firmly secured.

B indicates the tread, composed of high-grade rubber, which is set between the flanges of the channel-piece and firmly secured in the channel thereof by the retaining-wires $b\ b$. The tread may be made in one continuous piece, as in Fig. 4; but I have found that for economical and other reasons hereinafter mentioned good results can be obtained by making the body portion of one piece of high-grade rubber and the base portion of another and inferior quality of rubber. This cheap filling or base piece is indicated at $b'$ and is shown as filling the channel from flange to flange, but extending only about half the height of the latter, thus leaving ample space for centering and retaining the tread or body portion between said flanges. The use of this cheap filling-piece does not impair the efficiency of the tire, but, on the other hand, decreases the compression of the tread within the channel, because of the filling being harder and less compressible, thus tending to equalize the compression at base and periphery.

The retaining-wires $b\ b$ are drawn through longitudinal apertures in the tread. Their ends are then fastened together in the usual manner to hold the parts. It has been found in practice, however, that the retaining-wires of the tread cut through the rubber, and thus leave the parts loose and cause the tread to buckle in the channel or pull out of the channel. To avoid this very objectionable feature and provide a tire of much longer life and greater durability, I have provided what I choose to term "bridges," located at intervals around and within the body of the tread portion of the tire for the purpose of sustaining the strain of and holding in place the retaining-wires. Such bridges are indicated by C and are composed of a body part $c$, having at each end a leg or support $c'$, thus leaving an opening or archway $c^2$. The body part is provided in its surface with several depressions $c^3$ in number and form corresponding with the retaining-wires, thus enabling the latter to be drawn tightly down therein and to hold firmly and securely the tread and channel-piece of the tire together.

To properly dispose the bridges, the tread at its base is provided at intervals with transverse vertical slits $b^2$, into which the bridges are entered or set, and if the tread is composed of two parts or kinds of material the filling-piece is provided at each edge with a slit at an angle to the channel, into which the bridges are entered and set. It will thus be seen that when the bridges have been properly disposed and the rubber vulcanized and the retaining-wires have been tightly drawn and fastened the latter will be centered to rest within the respective depressions in the bridges, and these latter will be forced into the channel and will tightly compress the tread therein and between the flanges of the channel-piece.

In making the tire, whether in a single piece or in two parts, the tread portion is first formed in the usual way in a tube-machine, and then the filling-piece, if employed, is formed and the two parts vulcanized together in molds, with the bridges properly placed in any suitable number. This mode of forming the tire causes the rubber to surge or flow in around and about the bridges and cause them to be firmly and compactly embedded in the body of the tread. This I consider an important feature of my invention and irrespective of whether the tread be made of one part or several parts, the essential feature being the bridges embedded and inclosed within the body of the yielding material. As shown at $c^4$, the bridges may also be provided with any suitable number of apertures, which when the tread portions are vulcanized, as above stated, will also permit the rubber to flow through and about the bridges, affording an additional means for holding the latter firmly in place.

The bridges are preferably made of metal, but may be made of any material found suitable for the purpose and are of a size and height to rest when depressed close to the flanges of the channel-piece and below the upper edges. When the ends of the bridges are in place, they compress the sides of the tread against the flanges of the channel-piece, preventing any material lateral movement of the tread and also preventing endwise movement of the bridges. From the shoulders the legs $c'$ are slightly inclined or curved away from the flanges of the channel-piece, this structure permitting material of the base of the tread to be compressed between said flanges and legs to in a measure cushion the bridges in the channel. Obviously the bridges can be made of any height, and the retaining-wires can be passed through the tread at any desired distance from the periphery thereof. Thus the distance of the retaining-wires from the bottom of the channel can be controlled and regulated to any desired extent.

It will thus be seen that I have produced a tire for all kinds of vehicles which is compact, strong, very durable, and cheap and one which in use is not liable to buckle or rupture and avoid all the objections and objectionable features which have been found to exist in tires of this class now known or in use.

In order that provision may be made for relieving the tread of the tire from undue compression, I prefer to provide core-pieces conforming in shape to the under part of the bridge-pieces and having the same thickness as the bridge-piece, and these core-pieces are inserted under the bridges while the rubber is being vulcanized. After vulcanizing, the core-pieces are withdrawn, leaving hollow spaces under the bridges, into which spaces the rubber may expand, as shown in Fig. 3.

Having thus described my invention and the best mode contemplated for producing the same, what I claim, and desire to secure by Letters Patent, is—

1. In a vehicle-tire, the combination with a tire composed of a body portion of high compressibility and a base portion of low compressibility having a plurality of slits running transversely therethrough, of bridges comprising flat pieces of suitable material inserted in each of said slits and having grooves therein adapted to receive retaining-wires, and wires running through said tire resting in said grooves and adapted to retain said tire in its channel, substantially as described.

2. A tire for vehicles comprising a channel-piece and a tread, retaining means supported on transverse bridges, said bridges resting on the channel-piece at their ends and in hollow portions of the tread and being cut away in the center to form spaces for expansion of the base portion, substantially as described.

3. In a vehicle-tire, the combination with a channel-piece, of a tread portion of relatively high compressibility and a base portion of relatively low compressibility, retaining means supported on transverse bridge-pieces in hollow portions of the tread, said bridge-pieces being cut away on the under side to form expansion-spaces for the base portion, substantially as described.

In testimony whereof I affix my signature in presence of two witnesses.

EDWIN B. CADWELL.

Witnesses:
C. V. EDWARDS,
RALPH JONAS.